US010703270B1

(12) United States Patent
Williams et al.

(10) Patent No.: US 10,703,270 B1
(45) Date of Patent: Jul. 7, 2020

(54) PARKING BRAKE ALARM SYSTEMS WITH DRIVER ABSENCE DETECTION

(71) Applicant: SBS, Incorporated, Silverton, OR (US)

(72) Inventors: Frank Williams, Silverton, OR (US); Bannion Frank Allen, Silverton, OR (US)

(73) Assignee: SBS, Incorporated, Silverton, OR (US)

( * ) Notice: Subject to any disclaimer, the term of this patent is extended or adjusted under 35 U.S.C. 154(b) by 0 days.

(21) Appl. No.: 16/506,092

(22) Filed: Jul. 9, 2019

Related U.S. Application Data

(60) Provisional application No. 62/696,098, filed on Jul. 10, 2018.

(51) Int. Cl.
*B60Q 1/00* (2006.01)
*B60Q 9/00* (2006.01)
*B60R 16/023* (2006.01)

(52) U.S. Cl.
CPC .............. *B60Q 9/00* (2013.01); *B60R 16/023* (2013.01)

(58) Field of Classification Search
CPC ................................ B60Q 9/00; B60R 16/023
USPC ......................................................... 340/453
See application file for complete search history.

(56) References Cited

U.S. PATENT DOCUMENTS

| | | | | |
|---|---|---|---|---|
| 3,641,488 A | * | 2/1972 | Mullin | B60Q 9/00 340/459 |
| 3,759,582 A | * | 9/1973 | Ohta | B60T 8/885 303/122.06 |
| 4,928,036 A | * | 5/1990 | Abboud | B60Q 1/1423 307/10.1 |
| 6,229,389 B1 | * | 5/2001 | Pullen | H03F 1/523 330/10 |
| 6,406,102 B1 | * | 6/2002 | Arnold | B60T 7/042 303/20 |
| 6,428,117 B1 | * | 8/2002 | Messersmith | B60T 13/22 188/151 A |
| 9,038,563 B1 | * | 5/2015 | Steinbring | B60Q 9/00 116/58 A |
| 2006/0097859 A1 | * | 5/2006 | Nordbruch | B60Q 9/00 340/440 |
| 2006/0163939 A1 | * | 7/2006 | Kuramochi | B60T 13/741 303/122.04 |
| 2008/0224841 A1 | * | 9/2008 | Lundgren | B60T 17/22 340/453 |
| 2009/0085368 A1 | * | 4/2009 | Coffelt | B60K 35/00 296/70 |
| 2010/0308644 A1 | * | 12/2010 | Ishikawa | B60T 7/14 303/10 |

(Continued)

*Primary Examiner* — Kerri L McNally
*Assistant Examiner* — Thang D Tran
(74) *Attorney, Agent, or Firm* — DWC Lw Firm, P.S.

(57) ABSTRACT

Vehicle parking brake warning systems are disclosed herein. In one implementation, a vehicle parking brake warning system may include a relay coupled to an operator warning system. The relay including a relay switch and a coil, the relay switch conductively couple the operator warning system to ground when closed, and the coil to cause the relay switch to open when an electrical current is flowing through the coil, the coil coupled to a first coil node and a second coil node. A brake status switch that couples the first coil node to a voltage source when closed. A driver status switch that couples the second coil node to ground when closed. And a capacitor coupled to the first coil node and the second coil node.

14 Claims, 3 Drawing Sheets

(56) References Cited

U.S. PATENT DOCUMENTS

| | | | |
|---|---|---|---|
| 2011/0039658 A1* | 2/2011 | Sokoll | B60T 7/122 |
| | | | 477/195 |
| 2011/0155486 A1* | 6/2011 | Iwaki | B60L 3/0076 |
| | | | 180/65.1 |
| 2012/0018240 A1* | 1/2012 | Grubaugh | B62D 51/02 |
| | | | 180/273 |
| 2014/0172240 A1* | 6/2014 | Schemmel | B60T 17/18 |
| | | | 701/49 |
| 2014/0266659 A1* | 9/2014 | Dwyer | A01D 34/6818 |
| | | | 340/438 |
| 2014/0266664 A1* | 9/2014 | Dwyer | B60K 35/00 |
| | | | 340/459 |
| 2015/0007541 A1* | 1/2015 | Albinger | A01D 69/02 |
| | | | 56/10.2 A |
| 2015/0375731 A1* | 12/2015 | Grover, Jr. | B60W 10/18 |
| | | | 701/70 |
| 2016/0089987 A1* | 3/2016 | Ichikawa | B60L 53/124 |
| | | | 701/22 |
| 2016/0114687 A1* | 4/2016 | Ichikawa | B60L 5/005 |
| | | | 701/22 |
| 2017/0118557 A1* | 4/2017 | Wan | H04R 3/007 |
| 2018/0086322 A1* | 3/2018 | Zula | B60K 37/06 |
| 2018/0105178 A1* | 4/2018 | Khafagy | B60W 10/182 |
| 2018/0148021 A1* | 5/2018 | Mannherz | B60T 13/662 |
| 2018/0201187 A1* | 7/2018 | Yellambalase | E05B 81/56 |

* cited by examiner

PARKING BRAKE ALARM SYSTEMS WITH DRIVER ABSENCE DETECTION

CROSS REFERENCE TO RELATED APPLICATION(S)

This application claims priority to U.S. Provisional Patent Application Ser. No. 62/696,098, filed on Jul. 10, 2018, which is incorporated herein by reference in its entirety.

BACKGROUND

1. Technical Field

The present disclosure relates to vehicle warning systems, and more particularly, to systems for use in providing a warning that a parking brake of a vehicle has not been actuated.

2. Description of Related Art

Heavy-duty vehicles such as trucks, buses, and so forth, commonly employ air or hydraulic parking brake systems. Proper usage of such parking brake systems by driver operators of such vehicles, particularly when driver operators step away from their vehicles, are essential to ensure public safety. That is, when a driver operator of a heavy-duty vehicle, as well as other types of vehicles, forgets to set the parking brakes upon exiting the vehicle, the vehicle may roll away potentially causing catastrophic damage. This, unfortunately, is an all-too-common occurrence as many heavy-duty vehicles are used for purposes where the driver operator must, as part of their everyday job duties, frequently stop their vehicle and step away from the driver's normal operating position (e.g., sitting in the driver seat or standing in the driver operator position for vehicles that permit standing driving). For example, drivers of delivery vehicles and airport shuttle buses are often getting off their seats to deliver packages or assisting in the offloading of passengers and luggage from their vehicles during the course of a normal workday.

In addition, both federal and state regulatory agencies in recent years—have contemplated or have enacted regulations regarding the use of and incorporation of various safety features related to parking brakes in these heavy-duty vehicles in order to ensure public safety. In other cases, other safety features for brakes have been incorporated by automakers into both heavy-duty as well as passenger vehicles without being prompted by regulations.

Currently, many types of vehicles including passenger vehicles provide an affirmative indication (e.g., a visible light or icon that is displayed on the driver instrument panel) that a parking brake is actuated (e.g., the parking brake is set or activated) when the ignition is turned-on to prevent the vehicle from being driven with the parking brake activated. However, such systems cannot provide an affirmative indication that a parking brake of a vehicle is not set when, for example, the driver operator of the vehicle hops off the driver seat (or in the case of vehicles that permits standing up driving the driver stepping away from the driver operator position). In some cases, this could result in an unattended vehicle, which may or may not be running, rolling away endangering the public. As a result, regulations are being considered that require school buses to have a system that will alert an operator of a school bus that the parking brake of the school bus is not actuated (e.g., not set or disabled).

SUMMARY

In a first embodiment, a vehicle system is provided that provides, when the driver operator of the vehicle is not at driver's normal operating position, a warning that indicates that the parking brake of the vehicle is disengaged. The system includes a vehicle operator warning system to provide an audio and/or visual warning indicating that the vehicle's parking brake is disengaged, the audio and/or visual warning to be provided when the vehicle operator warning system is conductively coupled to a voltage source and ground. The system may also include a first switch that is coupled to the vehicle operator warning system to conductively link the vehicle operator warning system to the voltage source when the first switch is coupled to the voltage source and is closed, the first switch to close when a parking brake of the vehicle is disengaged, and to open when the parking brake is engaged.

The system may further include a relay that is disposed at least partly along a breakable conductive path between the vehicle operator warning system and a ground node, the ground node to couple to the ground. The relay includes a relay switch and a coil, the relay switch to conductively link the vehicle operator warning system to the ground node when closed, and to sever the conductive link between the vehicle operator warning system and the ground node when open, the coil to cause the relay switch to open when an electrical current is flowing through the coil and to cause the relay switch to close when no electrical current is flowing through the coil, the coil coupled to a first node and a second node, the first node to further couple to the voltage source via the first switch.

The system may additionally include a second switch that is coupled to the second node, the second switch to conductively link the second node to the ground node when the second switch is closed and to sever the conductive link between the second node and the ground node when open, the second switch to open when a driver operator of the vehicle is detected as not being present at driver's normal operating position and to close when the driver operator of the vehicle is detected as being present at driver's normal operating position. The system may further include a capacitor that is coupled to the first node and the second node to receive and store electrical charge.

In a second embodiment, another vehicle system is provided that provides, when the driver operator of the vehicle is not at driver's normal operating position, a warning that indicates that the parking brake of the vehicle is disengaged. The system includes a vehicle operator warning system to provide an audio and/or visual warning indicating that the vehicle's parking brake is disengaged, the audio and/or visual warning to be provided when the vehicle operator warning system is conductively coupled to a voltage source and ground. The system may also include a first switch coupled to the vehicle operator warning system to conductively link the vehicle operator warning system to the ground when the first switch is coupled to the ground and is closed, the first switch to close when a parking brake of the vehicle is disengaged, and to open when the parking brake is engaged.

The system may further include a relay disposed at least partly along a breakable conductive path between the vehicle operator warning system and a voltage node, the voltage node to couple to the voltage source. The relay includes a relay switch and a coil, the relay switch to conductively link the vehicle operator warning system to the voltage node when closed, and to sever the conductive link between the operator warning system and the voltage node when open, the coil to cause the relay switch to open when an electrical current is flowing through the coil and to cause the relay switch to close when no electrical current is flowing through the coil, the coil coupled to a first node and a second node, the first node to further couple to ground via the first switch.

The system may additionally include a second switch that is coupled to the second node, the second switch to conductively link the second node to the voltage node when the second switch is closed and to sever the conductive link between the second node and the voltage node when open, the second switch to open when a driver operator of the vehicle is detected as not being present at driver's normal operating position and to close when the driver operator of the vehicle is detected as being present at driver's normal operating position. The system may further include a capacitor that is coupled to the first node and the second node to discharge stored electrical charge.

In one embodiment, a vehicle parking brake warning circuit is provided that includes a relay that is coupled to a first node, the first node to couple to an operator warning system that provides an audio and/or visual warning indicating that the vehicle's parking brake is disengaged when the operator warning system is conductively coupled to a voltage source and ground. The relay includes a relay switch and a coil, the relay switch to conductively link the first node to a second node when the relay switch is closed and to sever the conductive link between the first node and the second node when the relay switch is open, the second node to couple with the ground, the coil to cause the relay switch to open when an electrical current is flowing through the coil and to cause the relay switch to close when no electrical current is flowing through the coil, the coil coupled to a first coil node and a second coil node.

The circuit may further include a brake status switch that is coupled to the first coil node, the brake status switch to conductively link the first coil node to the voltage source when the brake status switch is coupled to the voltage source and is closed, the brake status switch to close when a parking brake of the vehicle is disengaged and to open when the parking brake is engaged. The circuit may additionally include a driver status switch that is coupled to the second coil node, the driver status switch to conductively link the second coil node to the ground when the driver status switch is coupled to the ground and is closed and to sever the conductive link between the second coil node and the ground when the driver status switch is open, the driver status switch to open when a driver operator of the vehicle is detected as not being present at driver's normal operating position and to close when the driver operator of the vehicle is detected as being present at driver's normal operating position. The circuit may also include a capacitor that is coupled to the first coil node and the second coil node to receive and store electrical charge.

In another embodiment, another vehicle parking brake warning circuit is provided that includes a relay that is coupled to a first node, the first node to couple to an operator warning system that provides an audio and/or visual warning indicating that the vehicle's parking brake is disengaged when the operator warning system is conductively coupled to a voltage source and ground. The relay includes a relay switch and a coil, the relay switch to conductively link the first node to a second node when the relay switch is closed and to sever the conductive link between the first node and the second node when the relay switch is open, the second node to couple with the voltage source, the coil to cause the relay switch to open when an electrical current is flowing through the coil and to cause the relay switch to close when no electrical current is flowing through the coil, the coil coupled to a first coil node and a second coil node.

The circuit may further include a brake status switch coupled to the first coil node, the brake status switch to conductively link the first coil node to the ground when the brake status switch is coupled to the ground and is closed, the brake status switch to close when a parking brake of the vehicle is disengaged and to open when the parking brake is engaged. The circuit may additionally include a driver status switch that is coupled to the second coil node, the driver status switch to conductively link the second coil node to the voltage source when the driver status switch is coupled to the voltage source and is closed and to sever the conductive link between the second coil node and the voltage source when the driver status switch is open, the driver status switch to open when a driver operator of the vehicle is detected as not being present at driver's normal operating position and to close when the driver operator of the vehicle is detected as being present at driver's normal operating position. The circuit may also include a capacitor that is coupled to the first coil node and the second coil node to discharge stored electrical charge.

DETAILED DESCRIPTION

Figure 1:
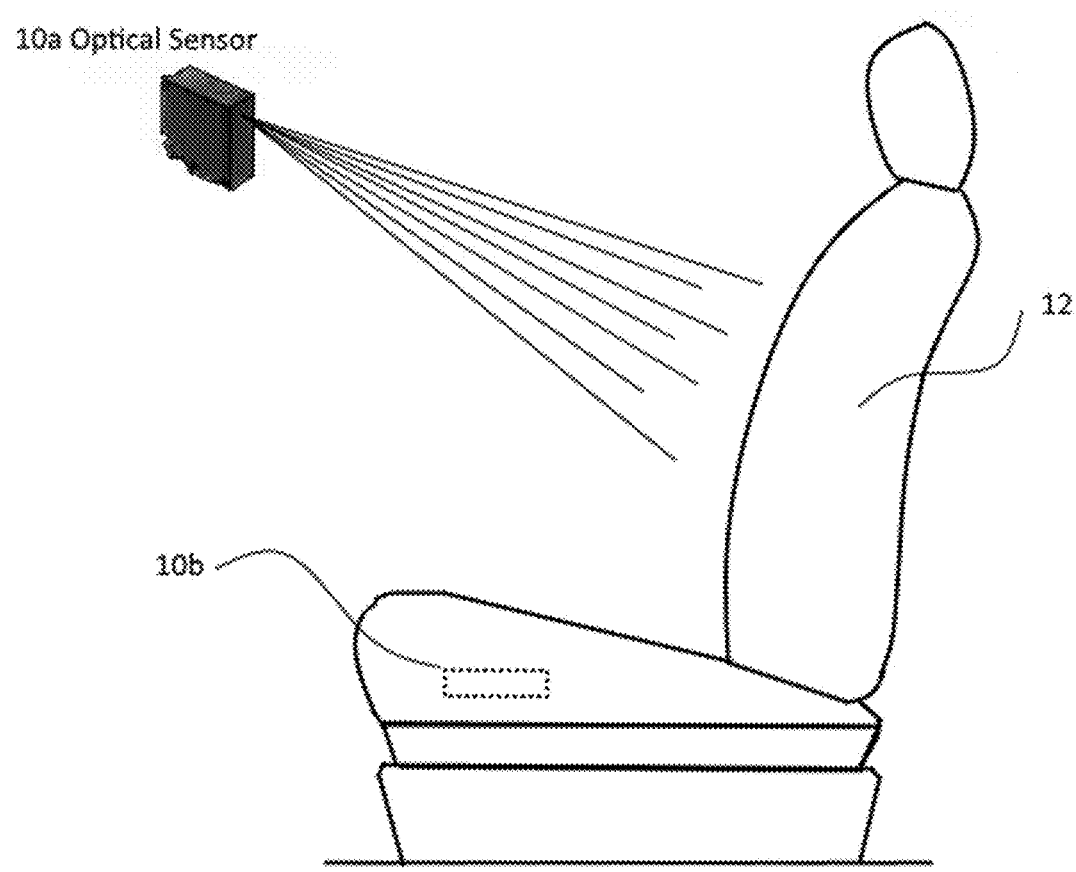
FIG. 1 illustrates an optical sensor positioned in front of a driver seat and an outline of a pressure sensor disposed in or under the driver seat according to an embodiment of the present disclosure.

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

In the following description, the words "coupled," "connected," and their variations, will be used to indicate that two or more components are electrically or conductively coupled together unless indicated otherwise.

Various embodiments in this disclosure are described in the context of parking brakes for heavy-duty vehicles. However, as will be understood by those skilled in the art after reviewing this disclosure, the embodiments may be suitable for use in other environments (e.g., in the context of small commercial vehicles or private passenger vehicles), and may be modified in the spirit of this disclosure to accommodate those environments.

According to various embodiments, parking brake warning systems are provided that are capable of, among other things, providing a warning to a driver operator (hereinafter simply "driver") of a vehicle that indicates that the parking brake of the vehicle is disengaged (e.g., not set or activated) when the driver has moved or stepped away from a "driver's normal operating position." For purposes of the following, the driver's normal operating position is the position and location of a driver that the driver would normally be in when the driver is operating the vehicle. For example, the normal position and location of a driver in many, if not most, conventional vehicles would be sitting on a driver seat. In other types of vehicles, such as those types of vehicles that permit standing driving (e.g., certain types of delivery vehicles), the normal position and location of a driver for such a vehicle would be the standing position and location of the driver when the driver is operating the vehicle. Normally, when the parking brake is disengaged, the driver should y be in the driver's normal operating position since an unattended vehicle with a disengaged parking brake could result in a catastrophic incident.

In some embodiments, the parking brake warning systems described herein may be used in heavy-duty vehicles that employ, for example, air brakes or other types of brakes. In other embodiments, however, the parking brake warning systems may be employed in other types of vehicles such as private passenger vehicles.

In various embodiments, the parking brake warning systems, when integrated into a vehicle, may employ one or more optical sensors or other types of sensors such as one or more pressure sensors in order to detect the presence or absence of a driver in the driver's normal operating position when the parking brake is disengaged. If the parking brake warning systems detect that a driver is absent from the driver's normal operating operation position beyond a certain length of time, such as 0.4 or 0.5 second (note that depending on circumstances such as the type of vehicle or how its use, the length of time may be greater or smaller than the 0.4 or 0.5 second), then the parking brake warning systems may generate an audio and/or visual warning that alerts the driver that the parking brake has not been actuated. The amount of time that a driver needs to be absent from the driver's normal operating position in order to trigger a parking brake warning will be referred to herein as "latch delay time" (which may also be referred to herein as a "relay delay time"). As will be further discussed below, by employing a latch delay time false triggering events (which tend to be brief events) that may cause false alerts to be generated may be filtered out.

That is, the use of optical sensors or other types of sensors (e.g., pressure sensors) for detecting presence or absence of an object at a particular location is well-known. However, use of optical sensors for detecting presence or absence of a driver in the driver's normal operating position (e.g., sitting in the driver seat) of a vehicle has been found to be problematic due to the prevalence of brief but frequent false triggering events. That is, because of the constantly changing lighting conditions (such as when the vehicle is moving) and the normal movements of the driver while operating the vehicle, the use of optical sensors as well as other types of sensors to detect driver presence or absence have proven to be unreliable and tend to provide many false alerts due to these fleeting false triggering events. Note that even the use of pressure sensors disposed in or under a driver seat will not prevent false alerts as drivers will often briefly slide or lift off their seats when, for example, they are reaching for something on the dashboard or instrument panel.

To address and mitigate these false triggering events, and as will be further described herein, the parking brake warning systems in accordance with various embodiments may employ a "false trigger filter delay circuit" that prevents the parking brake warning systems from flagging events that are false triggering events and that tend to be relatively fleeting. That is, the false trigger filtering delay circuit will cause the parking brake warning systems not to flag the absence of the driver in the driver's normal operating position when the detected absence does not extend beyond a certain threshold time span (e.g., latch delay time) such as, for example, a half a second (note that this time span may be greater or smaller depending on the specific environment in which the parking brake warning system will be used in such as type of vehicle and what the vehicle is being used for).

FIG. 1 illustrates an optical sensor 10a that has been placed at a location that has an unobstructed view to the center of the driver's seat back 12, as well as an outline of a pressure sensor 10b that is disposed in or under the driver's seat according to various embodiments. For these embodiments, the optical sensor 10a may be located above, on top of, or integrated into the driver's dashboard. In other embodiments, however, the optical sensor 10a may be located at other locations such as affixed to the interior of the windshield or a rearview mirror if there is one. In some embodiments, the optical sensor 10a may be a diffuse reflection sensor that is designed to detect light reflected off the object or subject (e.g., clothing of the driver) to be detected.

As noted above, FIG. 1 also shows an outline of a pressure sensor 10b that may be disposed in (or under) the driver seat that may detect the presence of a driver on the driver seat when it detects pressure caused by the weight of the driver sitting on the driver seat. In various embodiments, the optical sensor 10a, the pressure sensor 10b, and/or other types of sensors may be used individually or in combination to detect whether a driver is in the driver's normal operating position.

Figure 2:
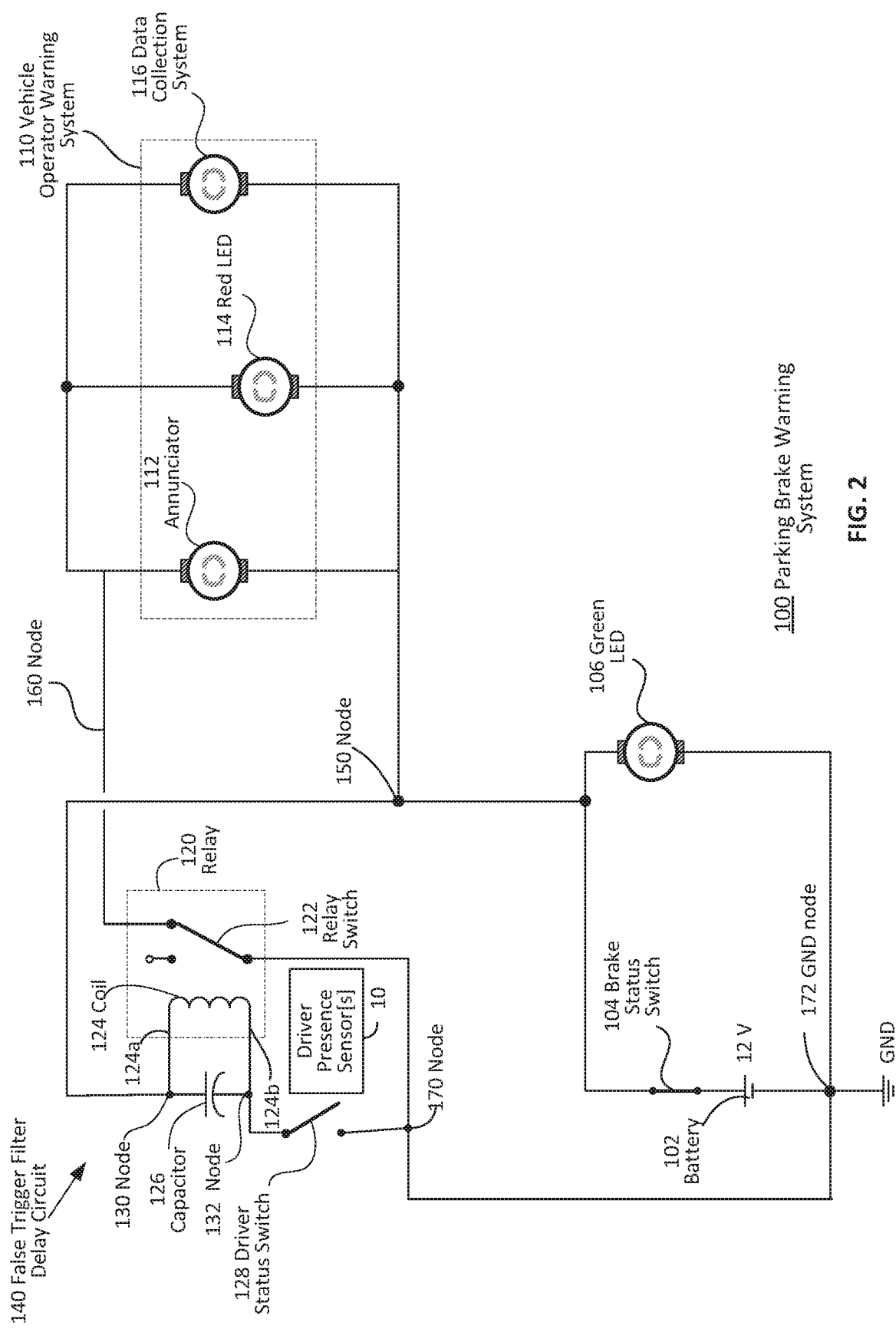
FIG. 2 illustrates a parking brake warning system according to some embodiments of the present disclosure.

FIG. 2 illustrates a parking brake warning system 100 according to one embodiment of the present disclosure. The parking brake warning system 100 may be integrated into a vehicle such as a heavy-duty commercial vehicle, a private passenger vehicle, a delivery vehicle, a mass-transit vehicle, a school bus, or other types of vehicles. The parking brake warning system 100 includes a vehicle operator warning system 110 (which may further include an annunciator 112, a red light emitting diode (LED) 114, and/or a data collection system 116), a brake status switch 104 for conductively or electrically coupling the vehicle operator warning system 110, as well as a false trigger filter delay circuit 140, to a power or voltage source in the form of a battery 102 (which may actually comprise of one or more batteries) when the parking brake is disengaged (note that the brake status switch 104 is illustrated as being "closed" in FIG. 2), and the false trigger filter delay circuit 140 (which may include, among other things, a driver status switch 128, a capacitor 126, and a relay 120 that includes a coil 124 and a relay switch 122) for conductively or electrically coupling the vehicle operator warning system 110 to ground when the driver operator of the vehicle is detected as being absent from the driver's normal operating position for at least a preselected interval or increment of time.

The parking brake warning system 100 may additionally include other components such as a "green" light emitting diode (LED) 106. In various embodiments, the green LED 106 (note that green LED 106 does not actually have to be a green LED, but could be any other color LED or other types of visual/audio indicator), such as a touchscreen that when provided with an electrical current, provides a visual indicator that indicates that the parking brake warning system 100 is activated.

As illustrated, the false trigger filter delay circuit 140 may be coupled to the battery 102 (via brake status switch 104) though node 150. The false trigger filter delay circuit 140 may also be coupled to ground through node 170 and through ground (GND) node 172 (which node 170 may be part thereof) that is configured to couple with ground. The false trigger filter delay circuit 140 may further be coupled to the vehicle operator warning system 110 through node 160.

In various embodiments, brake status switch 104 may be configured to close (as shown in FIG. 2) when the parking brake of the vehicle is detected as being disengaged, and to be open when the parking brake is detected as being engaged. In some embodiments, brake status switch 104 may be a pressure sensor activated switch that is configured to close when a pressure sensor (not illustrated) detects, for example, that the pressure in a delivery line of the air parking brake system is greater than a threshold value (such as for example, greater than 6-11 psi) which is indicative that the parking brake is disengaged. In other embodiments, however, the brake status switch 104 may be alternatively or additionally connected to other types of sensor systems for detecting whether the parking brake is engaged or disengaged.

When the brake status switch 104 is closed (e.g., parking brake is disengaged), voltage is provided to, among other things, the coil 124 of the false trigger filter delay circuit 140, and the annunciator 112, the red LED 114, and the data collection system 116 of the vehicle operator warning system 110. Note that when a current is flowing through the coil 124 (such as when the brake status switch 104 is closed and when the driver status switch 128 is closed), relay switch 122 will be open (e.g., FIG. 2 shows the relay switch 122 closed), and as a result, the vehicle operator warning system 110 will be isolated from ground. As a result, none of the components (e.g., the annunciator 112, the red LED 114, and the data collection system 116) of the vehicle operator warning system 110 are activated even though they are provided with voltage through brake status switch 104.

However, when the brake status switch 104 is closed (as a result of the parking brake being disengaged) and when the driver status switch 128 opens (as a result of the driver being detected as not being in his or her normal operating position), the relay switch 122 will not immediately close at least not until the capacitor 126 is fully saturated. That is, the presence of the capacitor 126 causes a delay in the relay switch 122 closing to provide to the vehicle operator warning system 110 a conductive path to ground (or to GND node 172). Only after the capacitor 126 has become fully saturated will the conductive path from the vehicle operator warning system 110 to ground (or to GND node 172) be established. The delay prevents, for example, the vehicle operator warning system 110 from prematurely generating alerts that may be due to fleeting false triggering events.

As will be further described herein, the annunciator 112 is an audio system (including one or more speakers) that when activated is configured to generate an audio warning, such as buzzing or ringing sound or a verbal audio warning such as ""WARNING THE PARKING BRAKE IS NOT SET." The red LED 114 is a visual device that when activated is designed to provide a visual warning, which in some cases, may be a flashing colored light (e.g., flashing red light or other flashing colored light), that indicates that the parking brake is not actuated or engaged. Similar to the green LED 106, the red LED 114 may not actually be a "red" LED, but may be any other color LED. Further, in some alternative embodiments, the red LED 114 may be other types of visual interfaces such as touchscreen that displays a message indicating that the parking brake is disengaged.

The data collection system 116 may be a system that is configured to, when activated, collect various types of data including digital video, temporal data (e.g., date/time), audio data, GPS data, and so forth. Such data may be collected using various devices including one or more digital cameras (disposed within the vehicle cabin and pointing to the driver and/or disposed externally and pointing forward and/or rearward from the vehicle), microphones, GPS, and so forth.

In various embodiments, and as alluded to above, the annunciator 112, the red LED 114, and the data collection system 116, when incorporated into a vehicle's warning or safety system, may be activated when at least two conditions arises: 1) when the vehicle's parking brake is disengaged; and 2) when the driver operator of the vehicle is not in the driver's normal operating position (e.g., sitting in the driver's seat) for at least a minimal amount of time. For example, when the parking brake is detected as being disengaged, the brake status switch 104 will be closed (as shown in FIG. 2) resulting in the battery 102 being conductively connected (e.g., providing voltage) to the operating warning system 110. Further, when the driver is detected as not being in the driver's normal operating position, the driver status switch 128 will open (as illustrated in FIG. 2), preventing current from flowing to ground through driver status switch 128. However, a current will continue flowing through coil 124, at least for a short period of time, until capacitor 126 is fully saturated. Once the capacitor is fully saturated, no additional current will flow through coil 124, which in turn, causes the relay switch 122 to close (as shown in FIG. 2). As a result, the vehicle operator warning system 110 will be conductively connected to ground. Once the vehicle operator warning system 110 is provided with both a voltage/current source (e.g., battery 102 via the brake status switch 104) and a conductive path to ground (e.g., via the false trigger filter delay circuit 140), the various components (e.g., the annunciator 112, the red LED 114, and the data collection system 116) can be activated.

As illustrated in FIG. 2, relay 120, which is part of the false trigger filter delay circuit 140, and which includes relay switch 122 and coil 124, among other things, is at least partly disposed along a breakable conductive path between the vehicle operator warning system 110 and GND node 172 that is configured to couple to ground. In particular, relay switch 122 will conductively link the vehicle operator warning system 110 to ground (via GND node 172) when it is closed and will sever the link when it is open. In FIG. 2, the breakable conductive path includes at least node 160, relay switch 122, and GND node 172 (note that node 170 may be part of GND node 172). The relay switch 122 will open or close depending on whether the coil 124 is generating or not generating a magnetic field as one of ordinary skill in the art will recognize. In particular, when an electrical current is flowing through the coil 124, a magnetic field will be generated and will result in the relay switch 122 being in the open position, preventing electrical current from flowing from the vehicle operator warning system 110 to ground thus deactivating the vehicle operator warning system 110. If, on the other hand, there is no current flowing through the coil 124, the coil will not generate a magnetic field (or at most a minimal amount thereof). As a result, relay switch 122 will be closed (as illustrated in FIG. 2) creating the conductive path from the vehicle operator warning system 110 to ground and activating the vehicle operator warning system 110 (if the brake status switch 104 is also closed).

The coil 124 has two terminals and are coupled to a node 130 (which may also be referred to as a first coil node) via a first terminal 124*a* and to a node 132 (which may also be referred to as a second coil node) via a second terminal 124*b*. The node 130 (e.g., first coil node) is further conductively coupled to a voltage source (e.g., battery 102) via the brake status switch 104 when the brake status switch 104 is coupled to the voltage source and is closed and node 132 (e.g., second coil node) is further coupled to ground via the driver status switch 128 and GND node 172 when the GND node 172 is coupled to ground and the driver status switch 128 is closed. Note that purposes of this description, a node may include, in addition to a wire or conductive line, a terminal, a connector, and/or other components used to conductively connect or couple to one or more circuit elements.

In various embodiments, driver status switch 128 may be coupled to driver presence sensor[s] 10, such as an optical sensor 10*a* and/or another type of sensor such as a pressure sensor 10*b* disposed in or under the driver seat. In some embodiments, the driver status switch 128 may close when the driver presence sensor[s] 10 detects the presence of the driver in the driver's normal operating position (e.g., sitting in the driver's seat) and may open when the driver presence sensor[s] 10 does not detect the presence of the driver (note that FIG. 2 shows driver status switch 128 being in an open position). As illustrated, capacitor 126 is coupled to the node 130 (e.g., first coil node) and the node 132 (e.g., second coil node).

Relay switch 122 is shown in FIG. 2 in its closed position and will only be in the open position when coil 124 is energized and has a current flowing through it. As one of ordinary skill in the art will recognize, capacitor 126 has a certain amount of capacitance that permits it to store electrical charge as well as to discharge stored electrical charge. The greater the capacitance properties of the capacitor 126, the greater the amount of electrical charge that the capacitor 126 can hold or discharge. As will be further explained below, the inclusion of the capacitor 126 provides the filtering functionality of the false trigger filter delay circuit 140 that addresses the false triggering events previously described. In some embodiments, the capacitor 126 may be an electrolytic capacitor (e.g., a polarized capacitor).

As noted above, when the coil 124 is electrically coupled to the battery 102 via the brake status switch 104, the capacitor 126 prevents electrical current that is flowing through coil 124 from stopping immediately whenever the driver status switch 128 opens (e.g., when the driver presence sensor 10 that is operatively coupled to the driver status switch 128 detects absence of the driver from the driver's normal operating position). Instead, electrical current may continue flowing through coil 124 for at least a short increment of time after the driver status switch 128 opens as capacitor 126 continues to receive and store electrical charge/current until capacitor 126 is saturated. Once the capacitor 126 is saturated, electrical current will stop flowing through the coil 124 and as a result, will stop generating a magnetic field, causing the relay switch 122 to close and resulting in the vehicle operator warning system 110 being provided with a conductive path to ground via the relay switch 122.

To appreciate how the various components of the parking brake warning system 100 interact and provide various functionalities, the following scenarios are provided related to a fictitious delivery vehicle employing the parking brake warning system 100 of FIG. 2, as well as the optical sensor 10*a* of FIG. 1. Initially, when a driver gets into the driver's seat of the delivery vehicle, the driver begins operating the vehicle by, among other things, turning on the ignition, and releasing the parking brake. As a result, brake status switch 104 will be closed causing the battery to provide voltage to node 150 and node 130 (e.g., first coil node) as well as providing voltage to the green LED 106, which provides a visual indicator that indicates that the parking brake warning system 100 is activated. Because the driver is sitting in the driver seat (e.g., situated in driver's normal operating position), driver status switch 128 is closed. As a result, electrical current flows through coil 124, which causes the relay switch 122 to be open. Because the relay switch 122 is open, there is no conductive path to ground for the vehicle operator warning system 110 and no current is going through the vehicle operator warning system 110 even though the vehicle operator warning system 110 is electrically coupled to the battery 102 through a closed brake status switch 102. Consequently, the annunciator 112, the red LED 114, and the data collection system 116 are all disabled.

When the delivery vehicle comes to a stop light, and the driver briefly reaches over for his work pad on top of the dashboard, the optical sensor 10*a* detects the absence of the driver from the driver's normal operating position, and as a result, the driver status switch 128 opens for the brief time that the driver is not visible to the optical sensor 10*a*'. Note that for purposes of this description, this may be referred to as a false triggering event. And although the driver status switch 128 is open for a brief time, the relay switch 122 remains opens (thus no conductive path to ground for the vehicle operator warning system 110) during this brief period when the driver status switch 128 is open due to the presence of capacitor 126, which permits current to continue flowing through the coil 124 for at least a brief period of time at least until capacitor 126 is fully saturated. As a result, coil 124 continues to generate a magnetic field and the relay switch 122 is kept open at least during the brief period when the driver is not visible to the optical sensor 10.

Note that the greater the capacitance properties of the capacitor 126, the longer the coil 124 can be kept energized (e.g., current flowing through) and therefore, the longer the relay switch 122 can be kept open delaying the vehicle operator warning system 110 from, for example, generating parking brake alarm/warning. Once the optical sensor 10 detects that the driver has returned to the driver's normal operating position, driver status switch 128 closes allowing electrical current to flow through the coil 124 and to ground (via ground node 172) keeping relay switch 122 open.

When the delivery vehicle reaches its first delivery stop, the driver stops the vehicle, turns the engine off, stands up from the driver seat, but forgets to engage the parking brake. As a result, the optical sensor 10*a* again detects the absence of the driver from the driver's normal operating position causing the driver status switch 128 to open. However, because of the presence of the capacitor 126, electrical current will continue to flow through coil 124 for at least a brief period even though driver status switch 128 is open. As a result, coil 124 will continue to generate a magnetic field at least for a short period of time keeping the relay switch 122 open. Once this brief period has elapsed (e.g., the time it takes for the capacitor 126 to be fully saturated), the relay switch 120 will close and the components (e.g., annunciator 112, red LED 114, and data collection system 116) of the vehicle operator warning system 110 will be activated.

By requiring that a triggering event last for some minimum amount of time to be considered as a "true" triggering event, false triggering events can be filtered out, and most, if not all, false alarms may be eliminated. Again, for purposes of this description, the particular amount of time required for a triggering event to be considered a true triggering event rather than a false triggering event will be referred to herein as a "latch delay time" or "relay delay time." As one of ordinary skill in the art will recognize, the capacitance properties of the capacitor 126, as well as the overall characteristics of the parking brake warning system 100, will normally dictate the length of the latch delay time. Thus, if the capacitor 126 has a relatively small capacitance then the latch delay time will be relatively small and the delay in the generation of the audio and/or visual parking brake warning will be relatively small. However, if the capacitance of the capacitor 126 is relatively large, the latch delay time (i.e., relay delay time) will be relatively large and the delay in the generation of the audio and/or parking brake warning will be relatively large.

It should be noted that if the latch delay time is too big (e.g., capacitance of the capacitor 126 is relatively large), then the generation of the audio and/or visual parking brake warning will be substantially delayed resulting in the driver not being able to hear or see the warning as the driver walks away from the vehicle. On the other hand, if the latch time delay is too short (e.g., the capacitance of the capacitor 126 is relatively small), then false triggering events (e.g., changing lighting conditions or driver moving around in the driver seat) will not be filtered out resulting in many false alarms being generated.

To control the amount of the latch delay time (and therefore, the alarm/warning delay), the capacitance of the capacitor 126 may be appropriately set to obtain a particular amount of alarm/warning delay (e.g., the amount of time that a triggering event must last before a warning is generated). In one embodiment, the capacitance of the capacitor 126 may be set such that the delay (e.g., latch delay time) in the generation of the audio and/or visual parking braking warning generated by the vehicle operator warning system 110 is less than one second, such as around 0.5 second. For example, in one embodiment, the capacitance of the capacitor 126 is approximately 220-1000 microfarad (uF). In some embodiments, the capacitor 126 may have a capacitance that results in a latch delay time of 0.4 to 1 second. In other embodiments, however, the capacitance of the capacitor 126 may be set at another level. In various embodiments, the time delay will be determined by both the resistance of the relay used and the capacitance of the capacitor.

Figure 3:
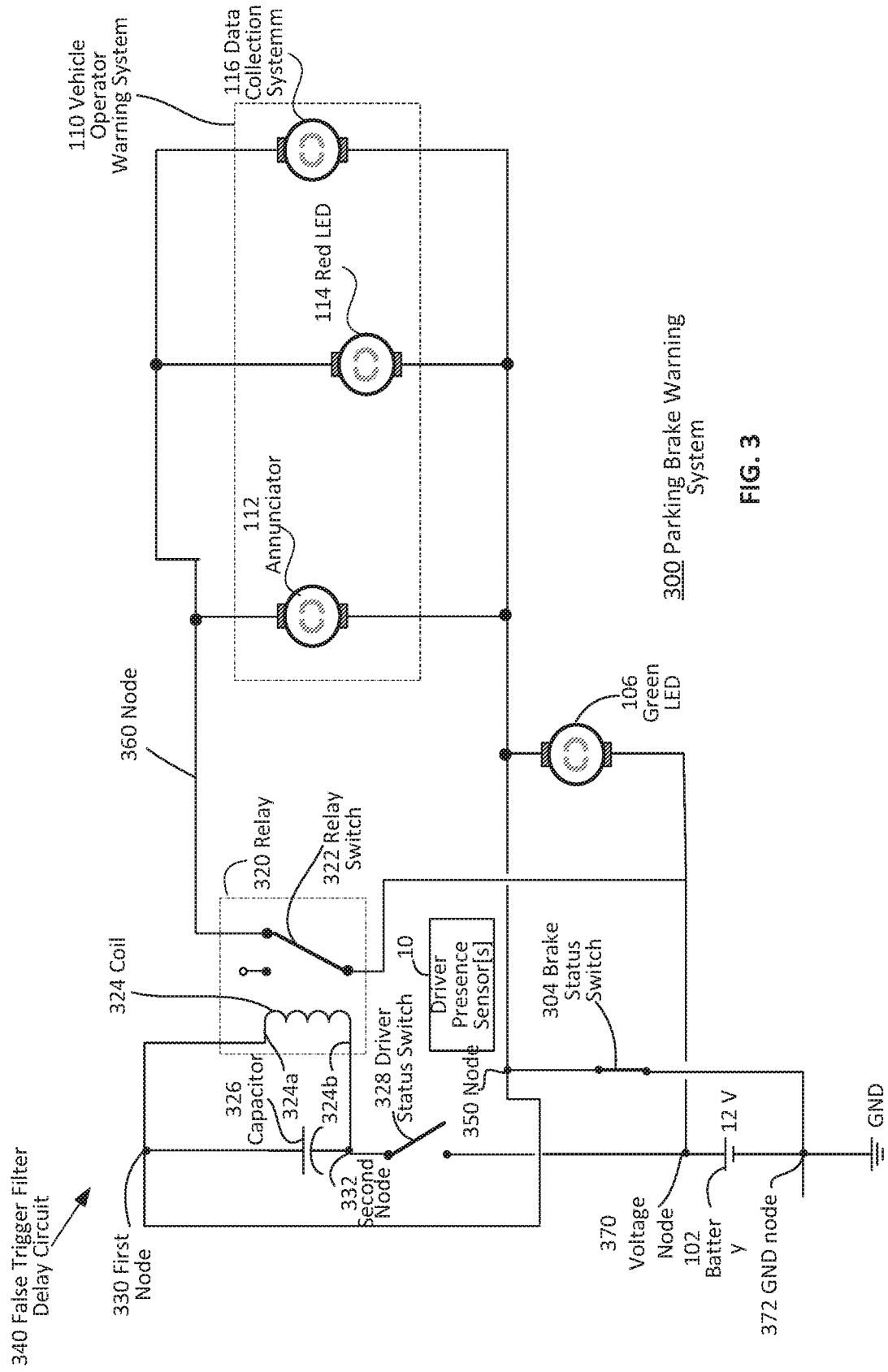
FIG. 3 illustrates another parking brake warning system according to some embodiments of the present disclosure.

FIG. 3 illustrates another parking brake warning system 300 according to another embodiment of the present disclosure. Similar to the parking brake warning system 100 of FIG. 1, the parking brake warning system 300 may be integrated into a vehicle such as a heavy-duty commercial vehicle, a private passenger vehicle, a delivery vehicle, a delivery vehicle, a mass-transit vehicle, a school bus, or other types of vehicles. The parking brake warning system 300 includes the same or similar components included in the parking brake warning system 100 of FIG. 2 except that the components are arranged differently such that the relay 320 (which corresponds to relay 120 of FIG. 2) is located along a breakable conductive path between the vehicle operator warning system 110 and the voltage source (e.g., battery 102) instead of being located along a breakable conductive path between the vehicle operator warning system 110 and ground as was the case in FIG. 2. In FIG. 3, the breakable conductive path between the vehicle operator warning system 110 and the voltage source includes node 360, relay switch 322, and voltage node 370 that is configured to couple with a voltage source (e.g., battery 102).

Like the parking brake warning system 100 of FIG. 2, the parking brake warning system 300 includes a vehicle operator warning system 110 (which further includes an annunciator 112, an LED 114, and a data collection system 116). Included in the parking brake warning system 300 is a brake status switch 304 for conductively linking the vehicle operator warning system 110 to ground through ground (GND) node 372 when the brake status switch 304 is closed as illustrated in FIG. 3. The brake status switch 304 (like the brake status switch 104 of FIG. 2) is configured to close when the parking brake of the vehicle is detected as being disengaged and to be open when the parking brake is detected as being engaged. Thus, when the parking brake is detected as being disengaged, ground is provided to the vehicle operator warning system 110 as well as to the green LED 106.

Similar to the parking brake warning system 100 of FIG. 2, the parking brake warning system 300 includes a false trigger filter delay circuit 340, which may include, among other things, a driver status switch 328, a capacitor 326, and a relay 320 that includes a coil 324 and a relay switch 322 similar to the false trigger filter delay circuit 140 of FIG. 2. Each of the components of the false trigger filter delay circuit 340, as well the other components of parking brake warning system 300, generally perform the same or similar functions as their counterpart in the parking brake warning system 100 of FIG. 2. For example, and similar to the driver status switch 128 of FIG. 2, the driver status switch 328 may be coupled to one or more driver presence sensors 10 (e.g., an optical sensor 10a and/or pressure sensor 10b) and that may be configured to close when the driver presence sensor[s] 10 detects the presence of the driver in the driver's normal operating position and may be configured to open when the driver presence sensor[s] 10 does not detect the presence of the driver (FIG. 3 shows driver status switch 328 being in an open position).

When the driver status switch 328 opens, the electrical current that may be flowing through coil 324 prior to the driver status switch 328 opening will eventually stop (as soon as the charged stored by the capacitor 326 completely discharges). As a result, the magnetic field that was being generated by the electrical current flowing through the coil 126 ceases, which in turn, results in the relay switch 322 closing. As a result of the relay switch 322 closing, a conductive path from the voltage source (battery 102) to the various components of the vehicle operator warning system 110 is provided. Note that coil 324, which has two terminals, is coupled to node 330 (e.g., a first coil node) through a first terminal 324a and coupled to a node 332 (e.g., a second coil node) through a second terminal 324b. Similarly, capacitor 326 is also coupled to nodes 330 and 332. Just like the capacitor 126 of FIG. 2, capacitor 326 may filter out false triggering events, particularly those that are of short duration.

As with the capacitor 126, the capacitance properties of the capacitor 326 will dictate the length of the relay delay time (i.e., latch delay time) associated with the false trigger filter delay circuit 340. Thus, if the capacitor 326 has a relatively small capacitance then the relay delay time will be relatively small and the delay in the generation of the audio and/or visual parking brake warning by the vehicle operator warning system 110 will be relatively small. However, if the capacitance of the capacitor 326 is relatively large, the relay delay time will be relatively large and the delay in the generation of the audio and/or parking brake warning will be relatively large. Note that although the relay delay time associated with capacitor 126 of FIG. 2 is tied at least partly to the amount of charge that the capacitor 126 is able to receive/store before it is completely saturated, the relay delay time associated with capacitor 326 of FIG. 3, in contrast, is at least partly tied to the amount of charge that the capacitor 326 can discharge. In some embodiments, capacitor 326 may have a capacitance of approximately 220-1000 uF). In some embodiments, the capacitor 326 may have a capacitance that results in a relay delay time of 0.4 to 1 second or more.

As illustrated, the false trigger filter delay circuit 340 may be coupled to the ground (via brake status switch 304) though node 350. The false trigger filter delay circuit 340 may further be coupled to the vehicle operator warning system 110 through node 360 and may also be coupled to battery 102 through node 370. Node 370, which may also be referred to as a voltage node, may be configured to couple with a voltage source such as battery 102. Both the battery 102 and the brake status switch 304 may be coupled to ground via GND node 372.

In various embodiments, the parking brake warning systems described above may be employed with a parking brake system, such as the system described in U.S. Pat. No. 8,851,244, which is hereby incorporated by reference in its entirety, to automatically actuate a parking brake when, for example, a driver is detected as not being present at driver's normal operator position.

As one of ordinary skill in the art will recognize, in various embodiments, portions of the parking brake warning systems 100 and 300 of FIGS. 2 and 3 may be provided in separate modules. For example, in some embodiments, the vehicle operator warning system 110 of FIG. 2 may be embodied in one module, while the trigger filter circuit 140 and the brake status switch 104 of FIG. 2 may be included in one or more other modules. These modules may then be combined and integrated into the safety and instrumentation system of a vehicle. Similarly, the vehicle operator warning system 110 of FIG. 3 may be embodied in one module, while the trigger filter circuit 340 and the brake status switch 304 of FIG. 3 may be provided in one or more other modules that may be combined and integrated into the safety and instrumentation system of a vehicle. Further, various components (e.g., driver status switch 128 or 328) of the false trigger filter delay circuit 140 or 340 may also be provided as separate and individual modules.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

What is claimed is:

1. A system, comprising:
a vehicle operator warning system for a vehicle to provide an audio and/or visual warning indicating that a parking brake of the vehicle is disengaged, the audio and/or visual warning to be provided when the vehicle operator warning system is conductively coupled to a voltage source and ground;
a first switch coupled to the vehicle operator warning system to conductively link the vehicle operator warning system to the voltage source when the first switch is coupled to the voltage source and is closed, the first switch to close when a parking brake of the vehicle is disengaged, and to open when the parking brake is engaged;
a relay disposed at least partly along a breakable conductive path between the vehicle operator warning system and a ground node, the ground node to couple to the ground, the relay including a relay switch and a coil, the relay switch to conductively link the vehicle operator warning system to the ground node when closed, and to sever the conductive link between the vehicle operator warning system and the ground node when open, the coil to cause the relay switch to open when an electrical current is flowing through the coil and to cause the relay switch to close when no electrical current is flowing through the coil, the coil directly coupled to a first node and a second node, the first node to further couple to the voltage source via the first switch;
a second switch directly coupled to the second node, the second switch to conductively link the second node to the ground node when the second switch is closed and to sever the conductive link between the second node and the ground node when open, the second switch to open when a driver operator of the vehicle is detected as not being present at driver's normal operating position and to close when the driver operator of the vehicle is detected as being present at driver's normal operating position, wherein the second switch is coupled to an optical sensor or a pressure sensor to detect the presence or absence of the driver operator at the driver's normal operating position; and
an electrolytic capacitor directly coupled to the first node and the second node to receive and store electrical charge.

2. The system of claim 1, wherein the vehicle operator warning system includes an annunciator and/or a light emitting diode (LED) to generate the audio and/or visual warning.

3. The system of claim 1, wherein the vehicle operator warning system includes a data collection system for collecting at least one of a digital video data, temporal data, audio data, or GPS data, the collection of data to be prompted when the data collection system is coupled to the voltage source and ground.

4. The system of claim 1, wherein the electrolytic capacitor receives and stores the electrical charge when the electrical current or another electrical current is flowing through the coil and the second switch is open.

5. The system of claim 1, wherein the electrolytic capacitor has a capacitance of 220 to 1000 microfarad (uF).

6. The system of claim 1, wherein the electrolytic capacitor has a capacitance that results in a latch delay time of 0.4 to 1 second.

7. A system, comprising:
- a vehicle operator warning system for a vehicle to provide an audio and/or visual warning indicating that a parking brake of the vehicle is disengaged, the audio and/or visual warning to be provided when the vehicle operator warning system is conductively coupled to a voltage source and ground;
- a first switch coupled to the vehicle operator warning system to conductively link the vehicle operator warning system to the ground when the first switch is coupled to the ground and is closed, the first switch to close when a parking brake of the vehicle is disengaged, and to open when the parking brake is engaged;
- a relay disposed at least partly along a breakable conductive path between the vehicle operator warning system and a voltage node, the voltage node to couple to the voltage source, the relay including a relay switch and a coil, the relay switch to conductively link the vehicle operator warning system to the voltage node when closed, and to sever the conductive link between the operator warning system and the voltage node when open, the coil to cause the relay switch to open when an electrical current is flowing through the coil and to cause the relay switch to close when no electrical current is flowing through the coil, the coil directly coupled to a first node and a second node, the first node to further couple to ground via the first switch;
- a second switch directly coupled to the second node, the second switch to conductively link the second node to the voltage node when the second switch is closed and to sever the conductive link between the second node and the voltage node when open, the second switch to open when a driver operator of the vehicle is detected as not being present at driver's normal operating position and to close when the driver operator of the vehicle is detected as being present at driver's normal operating position, wherein the second switch is coupled to an optical sensor or a pressure sensor to detect the presence or absence of the driver operator at the driver's normal operating position; and
- an electrolytic capacitor directly coupled to the first node and the second node to discharge stored electrical charge.

8. The system of claim 7, wherein the vehicle operator warning system includes an annunciator and/or a light emitting diode (LED) to generate the audio and/or visual warning.

9. The system of claim 7, wherein the vehicle operator warning system includes a data collection system for collecting at least one of a digital video data, temporal data, audio data, or GPS data, the collection of data to be prompted when the data collection system is coupled to the voltage source and ground.

10. The system of claim 7, wherein the electrolytic capacitor discharges the stored electrical charge when the electrical current or another electrical current is flowing through the coil and when the second switch is open.

11. The system of claim 7, wherein the electrolytic capacitor has a capacitance of 220 to 1000 microfarad (uF).

12. The system of claim 7, wherein the electrolytic capacitor has a capacitance that results in a latch delay time of 0.4 to 1 second.

13. A vehicle parking brake warning circuit, comprising:
- a relay coupled to a first node, the first node to couple to an operator warning system for a vehicle that provides an audio and/or visual warning indicating that a parking brake of the vehicle is disengaged when the operator warning system is conductively coupled to a voltage source and ground, the relay including a relay switch and a coil, the relay switch to conductively link the first node to a second node when the relay switch is closed and to sever the conductive link between the first node and the second node when the relay switch is open, the second node to couple with the ground, the coil to cause the relay switch to open when an electrical current is flowing through the coil and to cause the relay switch to close when no electrical current is flowing through the coil, the coil directly coupled to a first coil node and a second coil node;
- a brake status switch coupled to the first coil node, the brake status switch to conductively link the first coil node to the voltage source when the brake status switch is coupled to the voltage source and is closed, the brake status switch to close when a parking brake of the vehicle is disengaged and to open when the parking brake is engaged;
- a driver status switch directly coupled to the second coil node, the driver status switch to conductively link the second coil node to the ground when the driver status switch is coupled to the ground and is closed and to sever the conductive link between the second coil node and the ground when the driver status switch is open, the driver status switch to open when a driver operator of the vehicle is detected as not being present at driver's normal operating position and to close when the driver operator of the vehicle is detected as being present at driver's normal operating position, wherein the driver status switch is coupled to an optical sensor or a pressure sensor to detect the presence or absence of the driver operator at the driver's normal operating position; and
- an electrolytic capacitor directly coupled to the first coil node and the second coil node to receive and store electrical charge.

14. The vehicle parking brake warning circuit of claim 13, wherein the electrolytic capacitor has a capacitance of 220 to 1000 microfarad (uF).

\* \* \* \* \*